United States Patent

[11] 3,600,710

[72] Inventors Robert Adler
Northfield;
Adrian J. De Vries, Elmhurst, both of, Ill.

[21] Appl. No. 752,073
[22] Filed Aug. 12, 1968
[45] Patented Aug. 17, 1971
[73] Assignee Zenith Radio Corporation
Chicago, Ill.

[54] ACOUSTIC SURFACE WAVE FILTER
6 Claims, 5 Drawing Figs.

[52] U.S. Cl. 333/72, 333/30, 310/9.7
[51] Int. Cl. H03h 9/30, H03h 9/32
[50] Field of Search 333/30, 72; 310/8; 330/5.5; 343/17.2; 340/10

[56] References Cited
UNITED STATES PATENTS

| | | | |
|---|---|---|---|
| 3,289,114 | 11/1966 | Rowen | 333/30 |
| 3,376,572 | 4/1968 | Mayo | 343/17.2 |
| 3,360,749 | 12/1967 | Sittig | 333/30 |
| 3,446,974 | 5/1969 | Selwatz | 333/72 |
| 3,401,360 | 10/1968 | Du Bois | 333/30 |

*Primary Examiner*—Herman Karl Saalbach
*Assistant Examiner*—C. Baraff
*Attorneys*—Francis W. Crotty and Hugh H. Drake

ABSTRACT: A body of piezoelectric material propagates acoustic surface waves. A first surface wave interaction device is actively coupled to that surface to interact with the waves. Spaced on the same surface from the first device is a second such interaction device. The interaction devices are segmented into a plurality of interjacent arrays of electrode elements and the spacing between successive electrode elements is equal to an integral multiple of one-half wavelength at the desired operating frequency. The arrays are electrically coupled in series and are disposed to effect cumulative interaction with the surface waves.

PATENTED AUG 17 1971 3,600,710

Inventors
Robert Adler
Adrian J. De Vries
By Francis W. Crotty
Attorney

ACOUSTIC SURFACE WAVE FILTER

This invention pertains to acousto-electric filters. More particularly, it relates to solid-state tuned circuitry which involves interaction between a transducer device coupled to a piezoelectric material and acoustic surface waves propagated in that material.

In copending application Ser. No. 721,038, filed Apr. 12, 1968, and assigned to the same assignee as the present application, there are disclosed and claimed a number of different acousto-electric devices in which acoustic surface waves propagating in a piezoelectric material interact with transducers coupled to the surface waves. In each of the devices particularly disclosed in that application, the surface waves launched on the surface of the body of piezoelectric material are caused, in one manner or another, to interact with a second transducer spaced along the surface from the first. In the simplest case, the first transducer is coupled to a source of signals while the second transducer is coupled to a load. The signal energy is translated by the acoustic waves between the two transducers.

In practice, such devices have been demonstrated to exhibit characteristics useable in a number of different applications. In a television receiver, for example, acoustic filter systems have been included in the intermediate-frequency (IF) channel in order to impose a desired IF characteristic with traps or null points at selected frequencies spaced from the IF carrier frequency and determined by the structure of components of the acoustic filter system. As another example, an acoustic filter may serve in a frequency-modulation (FM receiver as the discriminator to perform the necessary function of converting frequency changes to amplitude changes.

While the demonstrations thus far have been highly encouraging, one difficulty encountered has been that, in some system applications, the impedance presented by the wave interaction devices to associated circuitry or other devices is considerably less than desired for the purpose of obtaining optimum matching and signal transfer characteristics.

It is, accordingly, a general object of the present invention to provide acousto-electric filters in which the impedance presented may be significantly increased.

Another object of the present invention is to provide a relatively high-impedance acousto-electric filter that still is sufficiently small for use in integrated circuitry applications.

A further object of the present invention is to provide an acousto-electric filter in which the foregoing ends are achieved by means fully compatible with integrated circuit techniques.

In other applications, the electrodes of the wave interaction device may present excessive ohmic lead resistance. Accordingly, a still further object of the present invention is to provide an acousto-electric filter in which such lead resistance is reduced.

An acoustic filter of the kind to which the present invention applies includes a body of piezoelectric material propagative of acoustic surface waves along a surface thereof. Actively coupled to that surface is a wave interaction device. In accordance with one improvement of the present invention, the surface wave interaction device is segmented into a plurality of interjacent electrode arrays. These arrays are electrically coupled in series combination and are disposed to effect cumulative interaction with the surface waves.

Specific forms of the invention include plural arrays of interleaved combs of conductive electrodes. In accordance with another improvement of the invention, one of the combs in one array has a spine in common with one of the combs of an adjacent array.

The features of the present invention which are believed to be novel are set forth with particularly in the appended claims. The organization and manner of operation of the invention, together with further objects and advantages thereof, may best be understood by reference to the following description taken in conjunction with the accompanying drawing, in the several figures of which like reference numerals identify like elements and in which:

Figure 1:
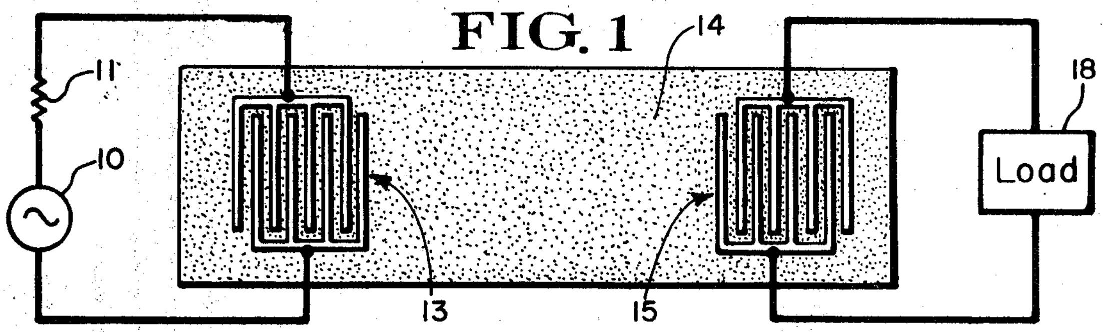
FIG. 1 is a partly schematic plan view of an acoustic filter system.

In FIG. 1, a signal source 10 in series with a resistor 11, which may represent the internal impedance of that source, is connected across an input transducer or surface wave interaction device 13 mechanically coupled to one major surface of a body of piezoelectric material in the form of a substrate 14. An output or second portion of the same surface of substrate 14 is, in turn, mechanically coupled to an output transducer 15 which is coupled across a load 18.

Transducers 13 and 15, in the simplest arrangement, are identical and are individually constructed as two comb-type electrode arrays. The stripes or conductive elements of one comb are interleaved with the stripes of the other. The electrodes are of a material, such as gold or aluminum, which may be vacuum deposited on a smoothly lapped and polished planar surface of the piezoelectric body. The piezoelectric material is one, such as PZT or quartz, that is propagative of acoustic surface waves. The distance between the centers of two consecutive stripes in each array is one-half of the acoustic wavelength of the signal wave for which it is desired to achieve maximum response.

Direct piezoelectric surface wave transduction is accomplished by the spatially periodic interdigital electrodes or teeth of transducer 13. Considering this device as a transmitter, a periodic electric field is produced when a signal from source 10 is fed to the electrodes and, through piezoelectric coupling, the electric signal is transduced to a traveling acoustic surface wave on substrate 14. This occurs when the strain components produced by the electric field in the piezoelectric substrate are substantially matched to the strain components associated with the surface wave mode. Source 10, for example a portion of a television receiver, produces a range of signal frequencies, but due to the selective nature of the arrangement only a particular frequency and its intelligence-carrying sidebands are converted to a surface wave. More specifically, source 10 may be the tunable front end of a television receiver which selects a desired program signal for application to load 18 which, in this environment, comprises stages of a television receiver subsequent to the IF selector and which respond to the program signal in producing a television image and its associated audio program. The surface waves resulting on substrate 14, in response to the energization of transducer 13 by the IF output signal from source 10, are translated along the substrate to output transducer 15 where they are converted to an electrical output signal for application to load 18.

In a typical television IF embodiment, utilizing PZT as the piezoelectric substrate, the stripes of both transducer 13 and transducer 15 are approximately 0.5 mil wide and are separated by 0.5 mil for the application of an IF signal in the typical range of 40—46 megahertz. The spacing between transducer 13 and transducer 15 is n the order of 60 mils and the width of the wave front is approximately 0.1 inch. This structure of transducers 13 and 15 and substrate 14 can be compared to a cascade of two tuned circuits with a resonant frequency of approximately 40 megahertz, the resonant frequency being determined, at least to a first order, by the spacing of the stripes.

The potential developed between any given pair of successive stripes in electrode array 13 produces two waves traveling along the surface of substrate 14, in opposing directions perpendicular to the stripes for the illustrative isotropic case of a ceramic poled perpendicularly to the surface. When the distance between the stripes is one half of the acoustic wavelength of the wave at the desired input frequency, or is an odd multiple thereof, relative maxima of the output waves are produced by piezoelectric transduction in interaction device 15. For increased selectivity, additional electrode stripes are added to the comb patterns of devices 13 and 15. Further modifications and adjustments are described in the aforementioned copending application for the purpose of particularly shaping the response presented by the filter to the transmitted signal. Moreover, as disclosed and claimed in copending application Ser. No. 817,093, filed Apr. 17, 1969, the entire region of substrate 14 need not be piezoelectric; it is sufficient, and sometimes desirable, to have the piezoelectric property exhibited only directly under the comb arrays.

It is frequently desirable to match at least approximately the impedance of one stage of an electrical circuit to the adjoining stage in order to obtain sufficient transfer of signal power or to obtain suitable voltage levels. In electroacoustic filters of the kind described, the impedance present across the wave interaction devices typically has a comparatively low value, for example, of the order of 100 ohms. Consequently, difficulty is encountered in obtaining sufficient signal power transfer when such a wave interaction device is coupled externally to a high impedance source or load.

Generally speaking, the impedance of a surface wave transducer depends upon the material on which the transducing electrodes are deposited, the number of electrodes, the length of the electrodes (or the resulting width of the transducing device in a direction across the direction of wave propagation) and the particular configuration of the pattern. For a simple transducing device of the kind shown in FIG. 1, wherein the electrodes are of equal length and uniform spacing, the first three parameters just mentioned are of primary significance. In the typical design of a surface wave transducing device, the number of individual electrodes in the comb-array pair is dictated by the selectivity, i.e., the shape of response curve is dictated by the overall system requirements. The material of substrate 14 may be selected for its ease of fabrication and its particular velocity of wave propagation and for its ease of converting electrical into mechanical energy and vice versa (as expressed by its coupling factor). The electrode spacing is thereupon dictated by that velocity and the wavelength of the signals to be transmitted. The resulting capacitive reactance of the simple transducer is inversely proportional to the number of electrodes and the parallel conductance is inversely proportional to the square of that number.

To an extent, the transducing device impedance can be decreased by increasing the length of the electrodes; in general, the impedance is inversely proportional to that length. When the length of those electrodes is increased, however, their finite ohmic resistance likewise increases as a result of which signal losses may become prohibitive. Nevertheless, when a low impedance is required, it is possible to compromise the length, as between impedance and losses, while using several of the interleaved comb arrays connected in parallel in order to reduce the total overall impedance presented to a source or load.

When it is desired to increase the impedance, the same inverse relationship between the electrode length and impedance suggests that the electrodes be made shorter. However, as that length is reduced the angle of radiation or divergence of the waves is increased and results in increased signal losses. Only that portion of the launched waves having a proper orientation with respect to the electrodes of the other transducer interact usefully with that other transducer.

To achieve a higher impedance across the transducing device, while yet employing electrode lengths sufficient to limit divergence of the waves and thus obtain efficient transmission, it is contemplated to segment the transducing devices into a plurality of interjacent arrays of electrode elements with the spacing between successive electrode elements equal to an integral number of one-half wavelengths at the desired operating frequency and then electrically couple those arrays in series combination while disposing them to effect cumulative interaction with the surface waves. In the transducing device in FIG. 2, surface wave interaction device 20 is segmented into a pair of interleaved comb arrays 21 and 22 electrically connected in series between input or output terminals 23 and 24. For convenience of fabrication and to minimize the width of the ineffective region or gap of distance $h$, the two adjacent combs respectively in segments 21 and 22 have a common spine 25 and the electrode elements of these combs are in alignment with one another across the path of surface wave propagation on the substrate. In one sense, each of segments 21 and 22 is a separate wave interaction device, interacting with individual acoustic surface wave trains propagating in the same direction respectively along spaced but generally parallel paths individually intercepting the electrodes of the respective segments. At the same time, these two individual acoustic surface wave trains are entirely correlated so that, at a spaced second transducer which responds to the launching of those waves, the effect is essentially the same as if the individual electrodes or teeth in device 20 were almost twice as long. Yet, the impedance presented across terminals 23, 24 by device 20 is four times that which would be the case with a unitary surface wave device of the same width, i.e. with electrodes of a length which were the sum of the lengths of the individual electrodes in segments 21 and 22.

Figures 2, 3, 4, 5:
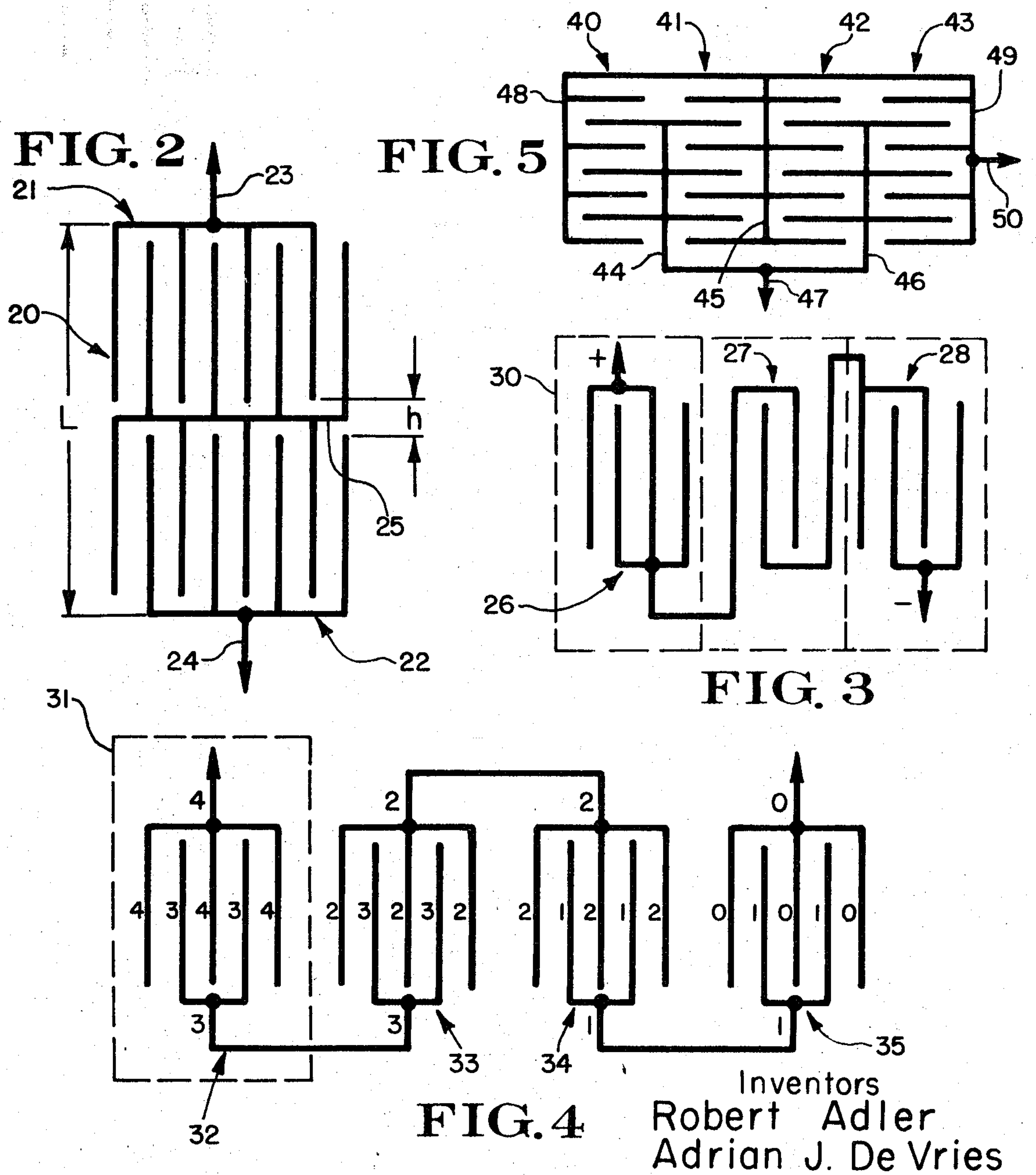
FIG. 2 is a schematic diagram of an electrode array pattern utilized in the device of FIG. 1 in accordance with one embodiment of the present invention.
FIGS. 3—5, inclusive, are schematic diagrams of alternative forms of electrode arrays utilizable in the system of FIG. 1.

In mathematical terms, if a transducing device having electrodes of a given length has an impedance Z, segmenting that device into a plurality of series-connected individual transducing devices of a number N causes the impedance to increase to a value $N^2Z$. The only additional loss or disturbance is that occasioned by the width of the gap between the electrodes of the successive segments, as indicated by the dimension $h$ in FIG. 2. By way of example, a typical unitary comb-array-type wave interaction device, designed to exhibit maximum signal response at 10 megahertz and disposed on a PZT substrate, has a width of 400 mils. With the wavelength of the surface waves being 8 mils, an impedance of approximately 200 ohms is presented at resonance with a total of 20 electrodes or teeth in the array. In contrast, by segmenting that transducer into two parts as shown in FIG. 2, while maintaining the same overall width L, the impedance is increased to a level of 800 ohms. The interruption between the segments, distance $h$, may be as small as about 10 mils. As a result, the interruption has only a negligible effect on the efficiency of the segmented pattern.

Instead of arranging the segmental arrays in a direction across the wave propagation path, the individual segments may be disposed in series along a common path as indicated in FIGS. 3 and 4. In FIG. 3, segments 26, 27, and 28 are made up of respectively different sections of the total number of comb electrodes or teeth. The section boundaries are indicated by the dashed lines 30. The relationship between the number of segments and the impedance increase is approximately the same as explained with respect to FIG. 2. That is, in FIG. 3, the division of the overall transducer into three series-connected segments increases the impedance level presented across its terminals by approximately a factor of 9.

With each of the segments in FIG. 3 having an even number of electrodes, the series interconnection of the segments is such that, as can be observed in the FIG. 3, equal signal potentials will appear on the two adjoining electrodes of each adjacent pair of segments. Consequently, those portions of the overall device between the segments are ineffective for the purpose of interacting with the propagating acoustic waves. While these regions of inactivity will affect the frequency response and efficiency of the transducer to some extent, the assignment of a sufficient number of electrodes to each segment minimizes that affect.

FIG. 4 is similar to FIG. 3 except that it includes a total of four series-connected segments 32—35 the first of which is outlined by dashed rectangle 31. Each of the segments in FIG. 4 has an odd number of electrodes in the combination of its interleave combs. IN consequence, the region between the adjoining electrodes of segments 33 and 34 is ineffective since those electrodes are at the same potential. On the other hand, the regions between the adjoining electrodes of segments 32 and 33 and between segments 34 and 35 are more effective than average because a potential difference of twice the average appears on the adjoining electrodes.

The different electrode potentials are exemplified by the small numbers immediately to the left of each electrode. Assuming that a potential difference of 4 volts, indicated by the 4 and 0 immediately to the left of connecting terminals, appears across the entire transducing device, the potential distribution throughout and between the different segments is illustrated. Thus, a 2-volt potential difference exists across the region between segments between 32 and 33 and between segments 34 and 35, while there is no potential difference across the region between segments 33 and 34. Within each segment, the potential difference across each adjoining pair of electrodes is 1 volt. Hence, the arrangement of FIG. 4 is slightly more efficient than that OF FIG. 3 although, once again, the overall frequency response will be somewhat affected as compared to the use of a single pair of interleaved comb electrodes otherwise having the same characteristics in terms of electrode lengths and number of electrodes. Being divided into four segments, the transducing device of FIG. 4 presents an impedance 16 times that which would be the case of the otherwise equivalent nonsegmented wave-transducing device.

The emphasis thus far has been upon a series combination of the array segments in order to increase the overall impedance presented to source or load. As indicated earlier, where a low impedance is permitted or required several of the interleaved comb arrays may be connected in parallel as a result of which the overall impedance is reduced. An arrangement to that end is illustrated in FIG. 5 wherein a surface wave interaction device is composed of interleaved comb-type arrays 40, 41, 42 and 43. Analogous to the pattern of FIG. 2, the two adjacent combs respectively in adjacent arrays have common spines. That is, the two adjacent combs respectively in segments 40 and 41 have a common spine 44. The other adjacent combs in respective segments have common spines 45 and 46. Spines 44 and 46 are connected together to external terminal 47, while spine 45 is connected in parallel or common with the two outermost spines 48 and 49 to the other external terminal 50. As in the case of FIG. 2, the use of the common spines is convenient with respect to fabrication and to minimize the width of the ineffective regions. The overall advantage of the FIG. 5 arrangement, as compared with a single pair of interleaved combs to launch the same width of wave fronts, lies in the attendant reduction of ohmic lead resistance encountered in the device.

Because the segmented units adjoin one another on the substrate, their series or parallel interconnection may be accomplished by depositing the connecting leads at the same time the comb arrays are deposited. Consequently, the selection of a particular impedance level from within a rather wide range is readily achieved simply by choosing the number of segments to be formed and arranging the interconnecting leads accordingly. In this way, that impedance which most efficiently responds to the requirements of the associate external circuitry may be at least closely approximated. At the same time, the manner in which the impedance selection is achieved suffers very little from attendant loss of overall efficiency.

Although particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. In an acoustic wave filter including a body of piezoelectric material propagative of acoustic waves along a surface thereof and having a surface wave interaction arrangement actively coupled to said surface, the improvement in which:

said surface wave interaction arrangement has an input terminal and an output terminal and a plurality of similar surface wave interaction devices, which individually have an array of interleaved electrode elements with the spacing between successive elements equal to an integral number of one-half wavelength at the desired operating frequency, which are electrically coupled in series between said input and output terminals, which are disposed to effect cumulative interaction with said surface waves nd which present across said input and output terminals in an impedance equal to $N^2Z$, where N is the number of said devices in said plurality and Z is the individual impedance of said devices.

2. A filter as defined in claim 1 in which said arrays are disposed to interact with individual acoustic wave trains propagating along a common path.

3. A filter as defined in claim 1 in which said devices are disposed to interact with individual acoustic wave trains propagating along a common path and in which each of said arrays includes an odd number of said electrode elements.

4. A filter as defined in claim 1 in which said devices are disposed to interact with individual acoustic waves trains propagating along a common path and in which each of said arrays includes an even number of said electrode elements.

5. In an acoustic wave filter including a body of piezoelectric material propagative of acoustic waves along a surface thereof and having a surface wave interaction arrangement actively coupled to said surface, the improvement comprising:

said surface wave interaction arrangement has an input terminal and an output terminal and a plurality of surface wave interaction devices having electrode arrays electrically coupled in combination and disposed to effect cumulative interaction with said surface waves, each of said arrays being composed of interleaved combs of conductive electrodes with the spacing between adjacent teeth of said combs being substantially one-half the wavelength of said waves;

and one of the combs in at least one of said arrays having a spine in common with that of one of the combs of an adjacent array.

6. A filter as defined in claim 5 in which said arrays are coupled in parallel combination.